United States Patent
Lin et al.

(10) Patent No.: US 9,551,894 B2
(45) Date of Patent: Jan. 24, 2017

(54) DISPLAY

(71) Applicant: Young Lighting Technology Inc., Hsin-Chu (TW)

(72) Inventors: Kuo-Long Lin, Hsin-Chu (TW); Hung-Yuan Hsu, Hsin-Chu (TW); Chao-Pang Ma, Hsin-Chu (TW); Ming-Hsien Su, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 14/807,851

(22) Filed: Jul. 23, 2015

(65) Prior Publication Data

US 2016/0195758 A1 Jul. 7, 2016

(30) Foreign Application Priority Data

Jan. 5, 2015 (TW) .............................. 104100061 A

(51) Int. Cl.
*G02F 1/1333* (2006.01)
*G02F 1/1335* (2006.01)

(52) U.S. Cl.
CPC ... *G02F 1/133308* (2013.01); *G02F 1/133603* (2013.01); *G02F 1/133605* (2013.01);
(Continued)

(58) Field of Classification Search
CPC ................. G02F 1/133308; G02F 1/133603; G02F 1/133606; G02F 2001/133314; G02F 2001/13332
(Continued)

(56) References Cited

U.S. PATENT DOCUMENTS 7,905,619 B2 * 3/2011 Iwamoto ........... G02F 1/133606
362/632
9,057,902 B2 * 6/2015 Zhang ............... G02F 1/133308
(Continued)

FOREIGN PATENT DOCUMENTS

CN 102778784 11/2012
JP 2005243377 9/2005
(Continued)

OTHER PUBLICATIONS

"Office Action of Taiwan Counterpart Application", issued on Nov. 3, 2015, p. 1-p. 9.

*Primary Examiner* — Laura Tso
(74) *Attorney, Agent, or Firm* — Jiang Chyun IP Office

(57) ABSTRACT

A display including a back cover, a diffuser plate, a display panel, and a light source is provided. The back cover has a first supporting portion, a connecting portion and a second supporting portion. Two opposite ends of the connecting portion are connected to the first supporting portion and the second supporting portion respectively. The first supporting portion has a first surface, the second supporting portion has opposite second and third surfaces, and the first surface faces the second surface to form a containing space between the first surface, the connecting portion and the second surface. At least a part of a periphery of the diffuser plate is disposed in the containing space. The display panel is supported on the third surface. The light source is disposed on the back cover and adapted to provide a light beam to illuminate the display panel after passing through the diffuser plate.

14 Claims, 4 Drawing Sheets

(52) U.S. Cl.
CPC ............... *G02F 1/133606* (2013.01); *G02F 2001/13332* (2013.01); *G02F 2001/133314* (2013.01)

(58) Field of Classification Search
USPC .................. 362/97.1, 97.4, 197.3, 197.2
See application file for complete search history.

(56) References Cited

U.S. PATENT DOCUMENTS

| | | | | |
|---|---|---|---|---|
| 2010/0079699 A1* | 4/2010 | Cho | .................. | G02F 1/133608 349/61 |
| 2010/0328927 A1* | 12/2010 | Huang | ............... | G02F 1/133606 362/97.1 |
| 2013/0235295 A1* | 9/2013 | Tang | ................. | G02F 1/133608 349/58 |
| 2014/0009716 A1* | 1/2014 | Tang | ................. | G02F 1/133608 349/58 |
| 2014/0104872 A1* | 4/2014 | Shin | ........................ | G09F 13/18 362/607 |
| 2014/0340875 A1* | 11/2014 | Hayashi | ............ | G02F 1/133308 362/97.1 |
| 2015/0241730 A1* | 8/2015 | Kondoh | ............ | G02F 1/133608 348/794 |
| 2015/0338571 A1* | 11/2015 | Jun | ...................... | G02B 6/0088 362/97.1 |
| 2016/0077275 A1* | 3/2016 | Lv | ..................... | G02F 1/133308 349/58 |
| 2016/0139463 A1* | 5/2016 | Oh | .................... | G02F 1/133603 362/97.1 |
| 2016/0147115 A1* | 5/2016 | Lee | ................... | G02F 1/133608 362/97.2 |

FOREIGN PATENT DOCUMENTS

| | | |
|---|---|---|
| JP | 2009211933 | 9/2009 |
| TW | 200801694 | 1/2008 |

* cited by examiner

DISPLAY

CROSS-REFERENCE TO RELATED APPLICATION

This application claims the priority benefit of Taiwan application serial no. 104100061, filed on Jan. 5, 2015. The entirety of the above-mentioned patent application is hereby incorporated by reference herein and made a part of this specification.

BACKGROUND OF THE INVENTION

Field of the Invention

The invention relates to a display, and relates particularly to a display having a back cover.

Description of Related Art

Smart phones, notebooks, tablet PCs, flat screen TVs and the like digital displays are developing with convenience of use, multi functions, and aesthetical appearance. When using these products, a display screen is an indispensable interface, and liquid crystal displays (LCD) have become the main stream for display screens. Because the LCD panel does not emit light inherently, a backlight module is arranged under the LCD panel to provide the light necessary for displaying an image.

Generally, a backlight module of a display requires a plastic frame mounted on a back cover (may also be termed as "back plate") to assemble a diffuser plate, an optical film set, a display panel and such components. However, excessive components make the overall thickness and frame width of the display unable to be effectively reduced, and is unfavorable for the trend of thin and narrow frame of displays. In addition, excessive components will increase the difficulty of assembly and manufacturing costs of the display.

China patent publication number CN101672999A discloses a display device which uses a back cover for accommodating the edges of optical films and uses the back cover for supporting the edges of the display substrate. China patent publication number CN102778784A discloses a back cover frame for supporting a liquid crystal panel and containing the sides of the optical parts. China patent publication number CN103267251A discloses a backlight module, in which the bending part of the back cover penetrates the hole of the optical film to position the optical film. China patent number CN203250090U discloses a back cover having a bending portion used to support the display panel.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display, favorable for a thin and narrow frame design that is easy to assemble, and may save manufacturing costs.

Other objectives and advantages of the invention may be further illustrated by the technical features broadly embodied and described as follows.

In order to achieve one or a portion of or all of the objects or other objects, an embodiment of the invention provides a display including a back cover, a diffuser plate, a display panel and at least one light source. The back cover has at least one first supporting portion, at least one connecting portion, and at least one second supporting portion. Two opposite ends of the connecting portion are connected to the first supporting portion and the second supporting portion respectively. A number of the connecting portion and the second supporting portion correspond with each other. The first supporting portion has a first surface, the second supporting portion has a second surface and a third surface opposite to the second surface, and the first surface faces the second surface to form a containing space between the first surface, the connecting portion and the second surface. At least a part of a periphery of the diffuser plate is disposed in the containing space. The display panel is supported on the third surface. The light source is disposed on the back cover and is adapted to provide a light beam to illuminate the display panel after passing through the diffuser plate.

In an embodiment, the first supporting portion, the connecting portion, and the second supporting portion are integrally formed.

In an embodiment, the second supporting portion has a guiding surface adjacent to the second surface, and the guiding surface bends toward the display panel is adapted to guide the diffuser plate into the containing space.

In an embodiment, the display may further include at least one first cushioning layer, wherein the first cushioning layer is disposed at the third surface and contacts the display panel.

In an embodiment, the back cover may further have a side wall, and the side wall is connected to an end of the first supporting portion that is away from the light source. The connecting portion is located between the side wall and an end of the first supporting portion that is close to the light source with respect to the end of the first supporting portion that is away from the light source.

In an embodiment, the display may further include a reflection sheet, wherein the reflection sheet is disposed on the back cover and is adapted to reflect the light beam to the diffuser plate. At least a part of a periphery of the reflection sheet is sandwiched between the diffuser plate and the first supporting portion.

In an embodiment, the reflection sheet has at least one opening, the opening is aligned with the light source, and the light source provides the light beam through the opening.

In an embodiment, the display panel has a bottom surface and at least one side surface adjacent to the bottom surface. The display panel is supported by the third surface via the bottom surface. The back cover may further have at least one stopper part, and the stopper part is connected to the first supporting portion. The display panel is stopped by the stopper part via the side surface.

In an embodiment, the first supporting portion and the stopper part are integrally formed.

In an embodiment, the display may further include a second cushioning layer, and the second cushioning layer is disposed at the stopper part and contacts the side surface of the display panel.

In an embodiment, the display may further include an optical film disposed on the diffuser plate, wherein the optical film has at least one protruding tab and the protruding tab has a positioning hole. The back cover may further have a positioning part, and the positioning part is connected to the first supporting portion and extends into the positioning hole.

In an embodiment, the first supporting portion and the positioning part are integrally formed.

In an embodiment, the display may further include a bezel. The bezel is assembled to the back cover and covers a periphery of the display panel. The back cover may further have at least one supporting part, and the supporting part is connected to the first supporting portion and abuts the bezel.

In an embodiment, the first supporting portion and the supporting part are integrally formed.

The embodiments of the invention have at least one of the advantages below. In the embodiments of the invention, a back cover contains a periphery of a diffuser plate via a containing space formed by a first supporting portion, a connecting portion, and a second supporting portion of the back cover. The back cover supports a display panel via the second supporting portion of the back cover. In this way, the display of the invention does not require an additional plastic frame disposed for assembling a display panel, a diffuser plate, an optical film and a bezel as in a conventional display, therefore may reduce the number of components of the display and lower the difficulty of assembly and manufacturing costs, and is favorable for the thin, light and narrow frame design of the display.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
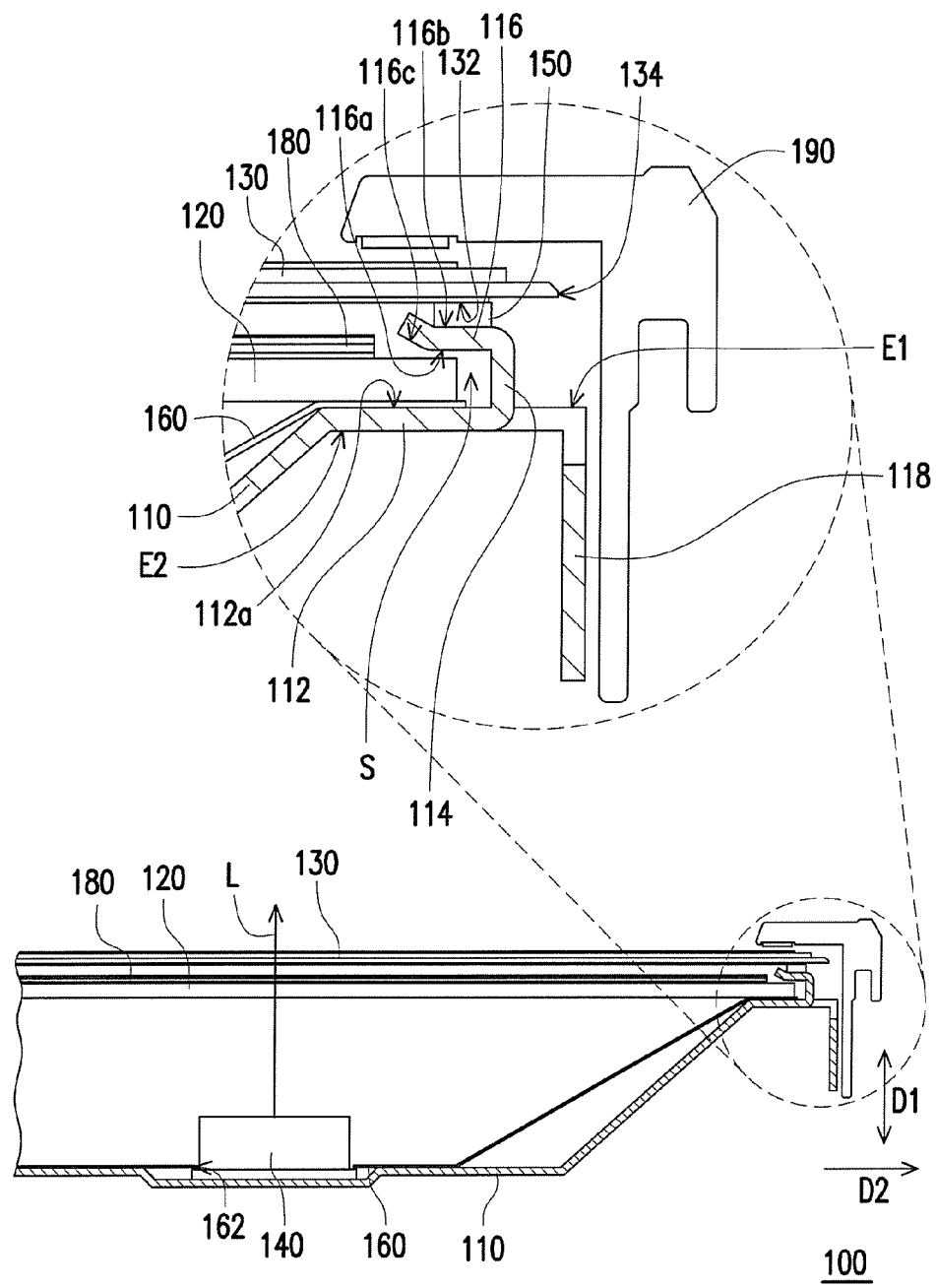
FIG. 1 is a schematic partial cross-sectional diagram illustrating a display according to an embodiment of the invention.

FIG. 1 is a schematic partial cross-sectional diagram illustrating a display according to an embodiment of the invention. Referring to FIG. 1, a display 100 of the present embodiment includes a back cover 110, a diffuser plate 120, a display panel 130 and a light source 140 (one is exemplarily shown). The back cover 110 includes at least one first supporting portion 112 (one is exemplarily shown), at least one connecting portion 114 (one is exemplarily shown) and at least one second supporting portion 116 (one is exemplarily shown). Two opposite ends of the connecting portion 114 are connected to the first supporting portion 112 and the second supporting portion 116 respectively, wherein the first supporting portion 112, the connecting portion 114 and the second supporting portion 116, for example, are integrally formed.

The first supporting portion 112 and the second supporting portion 116, for example, are parallel to each other, and the connecting portion 114, for example, is vertically connected between the first supporting portion 112 and the second supporting portion 116. The first supporting portion 112 has a first surface 112a. The second supporting portion 116 has a second surface 116a and a third surface 116b opposite to the second surface 116a, and the first surface 112a faces the second surface 116a to form a containing space S between the first surface 112a, the connecting portion 114, and the second surface 116a. At least a part of a periphery of the diffuser plate 120 is disposed in the containing space S to restrict the movement of the diffuser plate 120 along a direction D1 and a direction D2, wherein the direction D1, for example, is the thickness direction of the display 100, the direction D2 is the direction away from the light source 140, and the direction D2 is perpendicular to the direction D1. The display panel 130 is supported on the third surface 116b of the second supporting portion 116. The light source 140 is disposed on the back cover 110 and adapted to provide a light beam L. The light beam L illuminates the display panel 130 after passing through the diffuser plate 120, to provide the display panel 130 with the light necessary when displaying an image. It should be noted although only one light source 140 is exemplarily illustrated in FIG. 1, however, the invention is not limited thereto. A person of ordinary skill in the art may know that multiple light sources may be provided and disposed on the back cover 110 in other embodiments.

In one embodiment, the back cover 110 contains the periphery of the diffuser plate 120 via the containing space S formed by the first supporting portion 112, the connecting portion 114 and the second supporting portion 116 of the back cover 110, and supports the display panel 130 via the second supporting portion 116 of the back cover 110. In this way, the display 100 does not require an additional plastic frame disposed for assembling a display panel and a diffuser plate as in a conventional display, therefore may reduce the number of components of the display 100 and lower the difficulty of assembly and manufacturing costs, and is favorable for the thin and narrow frame design of the display 100.

The invention does not restrict the number of connecting portions 114 and the second supporting portions 116. In one embodiment, the number of the connecting portions 114 and second supporting portions 116 may be plural. Each of the connecting portions 114 and each of second supporting portions 116 correspond with each other and are suitably distributed at the periphery of the diffuser plate 120, such that the assembly of the diffuser plate 120 and the display panel 130 may be performed firmly via the first supporting portion 112, each connecting portion 114 and each second supporting portion 116.

As shown in FIG. 1, in one embodiment, the second supporting portion 116 has a guiding surface 116c adjacent to the second surface 116a. The guiding surface 116c bends towards the display panel 130, and the periphery of the diffuser plate 120 is adapted to move into the containing space S via the guiding of the guiding surface 116c, wherein the bent guiding surface 116c may enhance the convenience of assembling the diffuser plate 120 into the containing space S. In addition, the display 100 may include at least one first cushioning layer 150 which is disposed on the third surface 116b of the second supporting portion 116 and contacts the display panel 130, to provide a cushioning effect between the display panel 130 and the second supporting portion 116, preventing damage to the display panel 130. The first cushioning layer 150, for example, is silicone tape, cotton or other suitable material, and should not be construed as a limitation to the invention.

The back cover 110 of the present embodiment has a side wall 118. The side wall 118 is connected vertically to an end E1 of the first supporting portion 112 that is away from the light source 140. The connecting portion 114 is located between the side wall 118 and an end E2 of the first supporting portion 112 that is close to the light source 140, such that the connecting portion 114 and the second supporting portion 116 are bent inward with respect to the side wall 118.

In one embodiment, the display 100 further includes a reflection sheet 160. The reflection sheet 160 is disposed on the back cover 110 and is adapted to reflect the light beam L emitted by the light source 140 to the diffuser plate 120. At least a part of a periphery of the reflection sheet 160 is sandwiched between the diffuser plate 120 and the first surface 112a of the first supporting portion 112 as shown in the enlarged area of FIG. 1, to firmly fix the reflection sheet 160. In addition, the reflection sheet 160 has at least one opening 162. The opening 162 is aligned with the light source 140, in which the light source 140 is adapted to provide the light beam L through the opening 162. Wherein the light source 140, for example, is a light emitting diode (LED), however the invention is not limited thereto.

Figure 2:
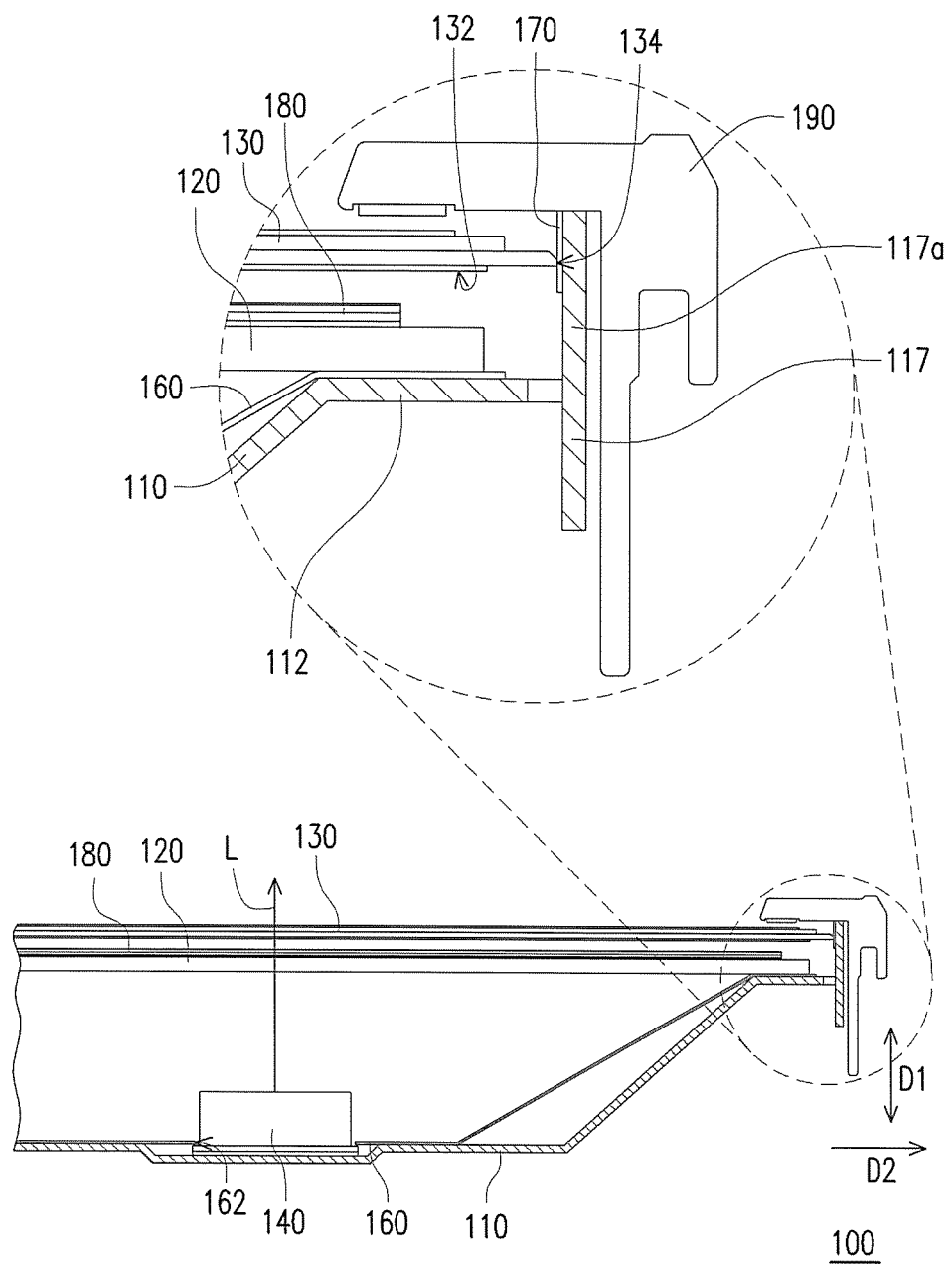
FIG. 2 is a schematic partial cross-sectional diagram of another section of the display in FIG. 1.

FIG. 2 is a schematic partial cross-sectional diagram of another section of the display in FIG. 1. Referring to FIG. 1 and FIG. 2, the display panel 130 of the present embodiment has a bottom surface 132 and at least one side surface 134 adjacent to the bottom surface 132. The display panel 130 as shown in FIG. 1 is supported by the third surface 116b of the second supporting portion 116 via the bottom surface 132. The back cover 110 as shown in FIG. 2 has at least one stopper part 117 (one is exemplarily illustrated). The stopper part 117 is connected vertically to the first supporting portion 112, wherein the first supporting portion 112 and the stopper part 117, for example, are integrally formed. The invention does not restrict the number of stopper parts 117, and the number of stopper parts 117, for example, is plural and are suitably distributed at the periphery of the display panel 130, such that the display panel 130 is stopped by the stopper part 117 via the side surface 134, to restrict the movement of the display panel 130 along the D2 direction, wherein the direction D2, for example, is perpendicular to the D1 direction. In this way, the display 100 does not require an additional plastic frame disposed for stopping a display panel as in a conventional display. In addition, in one embodiment, as shown in FIG. 2, the display 100 may further include a second cushioning layer 170. The second cushioning layer 170 is disposed at the stopper part 117 and contacts the side surface 134 of the display panel 130, to provide a cushioning effect between the display panel 130 and the stopper part 117, preventing damage to the display panel 130. The second cushioning layer 170, for example, is silicone tape, cotton or other suitable material, and should not be construed as a limitation to the invention.

Figure 3:
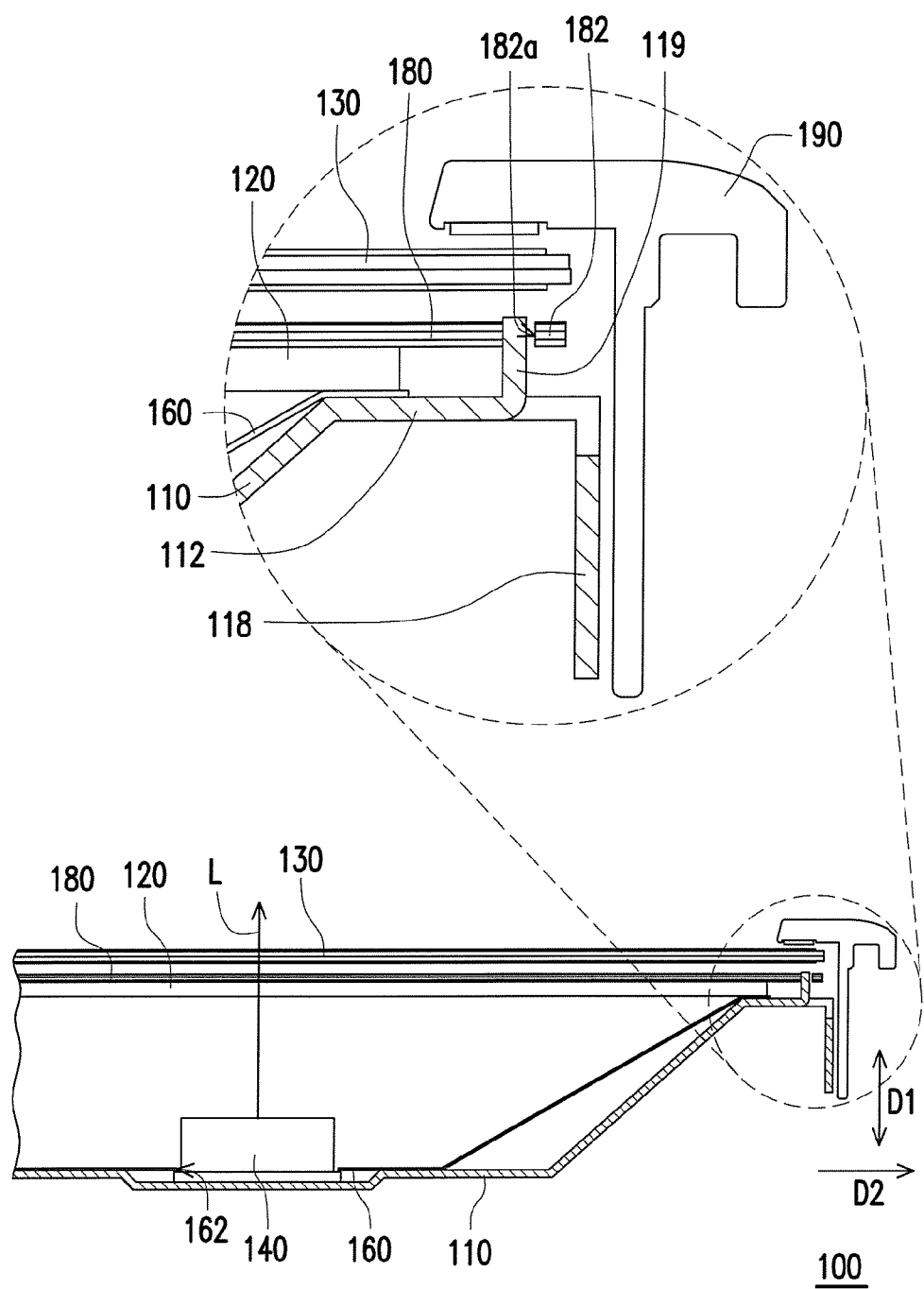
FIG. 3 is a schematic partial cross-sectional diagram of another section of the display in FIG. 1.
Figure 4:
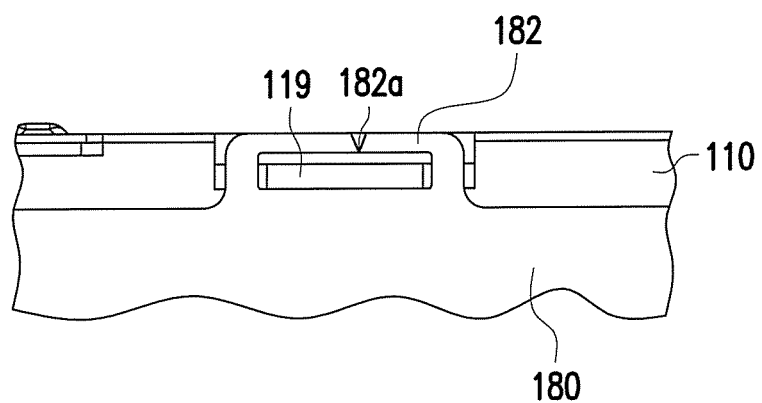
FIG. 4 is a schematic partial top view of the display in FIG. 3.

FIG. 3 is a schematic partial cross-sectional diagram of another section of the display in FIG. 1. FIG. 4 is a schematic partial plan diagram illustrating the display in FIG. 3. Referring to FIG. 3 and FIG. 4, the display 100 of the present embodiment further includes at least one optical film 180 (three optical films 180 are illustrated in FIG. 3 as an example). The optical film 180 is disposed on the diffuser plate 120 and has at least one protruding tab 182. The protruding tab 182 protrudes from the periphery of the optical film 180, and the protruding tab 182 has a positioning hole 182a. The back cover 110 has a positioning part 119. The positioning part 119 is connected to the first supporting portion 112 and extends into the positioning hole 182a of the protruding tab 182 to position the optical film 180. The first supporting portion 112 and the positioning part 119, for example, are integrally formed. In this way, the display 100 does not require an additional plastic frame disposed for positioning an optical film as in a conventional display.

Referring to FIG. 2, in one embodiment, the display 100 may further include a bezel 190. The bezel 190 is assembled to the back cover 110 and covers the periphery of the display panel 130. The back cover 110 has at least one supporting part 117a, and the supporting part 117a, for example, is the same structure as the aforementioned stopper part 117 and is connected to the first supporting portion 112 and abuts the bezel 190 along the D1 direction. The first supporting portion 112 and the supporting part 117a, for example, are integrally formed. In this way, the display 100 does not require an additional plastic frame disposed for supporting a bezel as in a conventional display. In other embodiments, the supporting part and the stopper part may be different structures and should not be construed as a limitation to the invention.

The embodiments of the invention have at least one of the advantages below. In the embodiments of the invention, a back cover contains a periphery of a diffuser plate via a containing space formed by a first supporting portion, a connecting portion, and second supporting portion of the back cover. The back cover supports a display panel via the second supporting portion of the back cover, stops the display panel via the stopper part, positions an optical film via a positioning part, and abuts a bezel via a supporting part. In this way, the display of the invention does not require an additional plastic frame disposed for assembling a display panel, a diffuser plate, an optical film and a bezel as in a conventional display, therefore may reduce the number of components of the display and lower the difficulty of assembly and manufacturing costs, and is favorable for the thin, light and narrow frame design of the display.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display, comprising:
   a back cover, comprising at least one first supporting portion, at least one connecting portion, and at least one second supporting portion, wherein two opposite ends of the connecting portion are connected to the first supporting portion and the second supporting portion respectively, the first supporting portion has a first surface, the second supporting portion has a second surface and a third surface opposite to the second surface, and the first surface faces the second surface to form a containing space between the first surface, the connecting portion and the second surface;
   a diffuser plate, at least a part of a periphery of the diffuser plate is disposed in the containing space;
   a display panel, supported on the third surface; and
   at least one light source, disposed on the back cover and adapted to provide a light beam to illuminate the display panel after passing through the diffuser plate.

2. The display as claimed in claim 1, wherein the first supporting portion, the connecting portion, and the second supporting portion are integrally formed.

3. The display as claimed in claim 1, wherein the second supporting portion has a guiding surface adjacent to the second surface, the guiding surface bends toward the display panel and is adapted to guide the diffuser plate into the containing space.

4. The display as claimed in claim 1, comprising at least one first cushioning layer, wherein the first cushioning layer is disposed at the third surface and contacts the display panel.

5. The display as claimed in claim 1, wherein the back cover has a side wall, the side wall is connected to an end of the first supporting portion that is away from the light source, and the connecting portion is located between the side wall and an end of the first supporting portion close to the light source with respect to the end of the first supporting portion that is away from the light source.

6. The display as claimed in claim 1, comprising a reflection sheet, wherein the reflection sheet is disposed on the back cover and is adapted to reflect the light beam to the diffuser plate, and at least a part of a periphery of the reflection sheet is sandwiched between the diffuser plate and the first supporting portion.

7. The display as claimed in claim 6, wherein the reflection sheet has at least one opening, the opening is aligned with the light source, and the light source provides the light beam through the opening.

8. The display as claimed in claim 1, wherein the display panel has a bottom surface and at least one side surface adjacent to the bottom surface, the display panel is supported by the third surface via the bottom surface, and wherein the back cover further has at least one stopper part, the stopper part is connected to the first supporting portion, and the display panel is stopped by the stopper part via the side surface.

9. The display as claimed in claim 8, wherein the first supporting portion and the stopper part are integrally formed.

10. The display as claimed in claim 8, comprising a second cushioning layer, wherein the second cushioning layer is disposed at the stopper part and contacts the side surface of the display panel.

11. The display as claimed in claim 1, comprising an optical film, disposed on the diffuser plate, wherein the optical film has at least one protruding tab, the protruding tab has a positioning hole, the back cover has a positioning part, and the positioning part is connected to the first supporting portion and extends into the positioning hole.

12. The display as claimed in claim 11, wherein the first supporting portion and the positioning part are integrally formed.

13. The display as claimed in claim 1, comprising a bezel, wherein the bezel is assembled to the back cover and covers a periphery of the display panel, and wherein the back cover further has at least one supporting part, the supporting part is connected to the first supporting portion and abuts the bezel.

14. The display as claimed in claim 13, wherein the first supporting portion and the supporting part are integrally formed.

* * * * *